US011473025B2

United States Patent
Plennevaux et al.

(10) Patent No.: US 11,473,025 B2
(45) Date of Patent: *Oct. 18, 2022

(54) METHOD FOR PROCESSING BIOMASS BY CO-GRINDING WITH A SECOND BIOMASS FEEDSTOCK

(71) Applicants: IFP Energies Nouvelles, Rueil-Malmaison (FR); Axens, Rueil Malmaison (FR); Commissariat A L'Energie Atomique Et Aux Energies Alternatives, Paris (FR); Total Raffinage Chimie, Courbevoie (FR); Thyssenkrupp Industrial Solutions AG, Essen (DE); Avril, Paris (FR); Bionext, Venette (FR)

(72) Inventors: Thomas Plennevaux, Rueil-Malmaison (FR); Jeremy Gazarian, Rueil-Malmaison (FR); Laurent Bournay, Rueil-Malmaison (FR); Norbert Ullrich, Essen (DE); Michael Hecquet, Octeville sur Mer (FR)

(73) Assignees: IFP Energies Nouvelles, Rueil-Malmaison (FR); Axens, Rueil Malmaison (FR); Commissariat A L'Energie Atomique Et Aux Energies Alternatives, Paris (FR); Total Raffinage Chimie, Courbevoie (FR); Thyssenkrupp Industrial Solutions AG, Essen (DE); Avril, Paris (FR); Bionext, Venette (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/253,652

(22) PCT Filed: Jun. 12, 2019

(86) PCT No.: PCT/EP2019/065398
§ 371 (c)(1),
(2) Date: Dec. 18, 2020

(87) PCT Pub. No.: WO2019/243140
PCT Pub. Date: Dec. 26, 2019

(65) Prior Publication Data
US 2021/0253963 A1 Aug. 19, 2021

(30) Foreign Application Priority Data
Jun. 21, 2018 (FR) .................. FR1855487

(51) Int. Cl.
| C10J 3/62 | (2006.01) |
| C10B 49/02 | (2006.01) |
| C10B 53/02 | (2006.01) |
| C10B 57/10 | (2006.01) |
| C10B 57/14 | (2006.01) |
| C10L 5/36 | (2006.01) |
| C10L 5/44 | (2006.01) |
| C10L 9/08 | (2006.01) |

(52) U.S. Cl.
CPC .................. *C10J 3/62* (2013.01); *C10B 49/02* (2013.01); *C10B 53/02* (2013.01); *C10B 57/10* (2013.01); *C10B 57/14* (2013.01); *C10L 5/366* (2013.01); *C10L 5/44* (2013.01); *C10L 9/083* (2013.01); *C10J 2300/0906* (2013.01); *C10J 2300/0909* (2013.01); *C10J 2300/0916* (2013.01); *C10L 2200/0469* (2013.01); *C10L 2290/08* (2013.01); *C10L 2290/28* (2013.01)

(58) Field of Classification Search
CPC .................. C10J 3/62; C10J 2300/0906; C10J 2300/0909; C10J 2300/0916; C10B 49/02; C10B 53/02; C10B 57/10; C10B 57/14; C10L 5/366; C10L 5/44; C10L 9/083; C10L 2200/0469; C10L 2290/08; C10L 2290/28
See application file for complete search history.

(56) References Cited

U.S. PATENT DOCUMENTS

| 9,422,492 | B2 | 8/2016 | Boissonnet et al. | |
| 2011/0209977 | A1* | 9/2011 | Rolland | F26B 3/082 201/31 |
| 2012/0060408 | A1* | 3/2012 | Bartek | C10L 9/083 502/151 |
| 2012/0266531 | A1 | 10/2012 | Hitchingham et al. | |
| 2015/0275112 | A1* | 10/2015 | Boissonnet | C10K 1/006 518/703 |

FOREIGN PATENT DOCUMENTS

| CN | 107652992 A | 2/2018 |
| WO | 2014/068253 A1 | 5/2014 |

OTHER PUBLICATIONS

International Search Report dated Jul. 9, 2019 issued in corresponding PCT/EP2019/065398 application (2 pages).
English Abstract of CN 107652992 A published Feb. 2, 2018.

* cited by examiner

Primary Examiner — Latosha Hines
(74) Attorney, Agent, or Firm — Millen, White, Zelano and Branigan, P.C.; Harry B. Shubin

(57) ABSTRACT

The present invention concerns a process for the treatment of a feed comprising biomass, said process comprising at least the following steps:
a) a step for drying said feed at a temperature in the range 20° C. to 180° C. for a period in the range 5 to 180 minutes,
b) a step for torrefaction of the dried feed obtained from step a) in order to produce at least one solid torrefied biomass effluent, and
c) a step for co-grinding the solid torrefied biomass effluent obtained from step b) in the presence of a second biomass feed in order to obtain a powder.

14 Claims, No Drawings

METHOD FOR PROCESSING BIOMASS BY CO-GRINDING WITH A SECOND BIOMASS FEEDSTOCK

FIELD OF THE INVENTION

The present invention relates to the treatment of biomass for its preparation for the purposes of upgrading it, in particular by gasification, for the production of liquid hydrocarbons, and optionally for the production of petrochemical bases and/or of chemical bases and/or of hydrogen.

More particularly, the present invention relates to a process for the treatment of a feed comprising biomass with a view to injecting it into a gasification reactor for the production of hydrocarbons, in particular gasoline, gas oil and kerosene.

PRIOR ART

In the field of the invention, a person skilled in the art will always be seeking to improve conditioning of biomass, in particular in order to improve its calorific value.

More particularly, improving the granulometry of the powder obtained by the treatment process starting from biomass and the energy costs associated with this treatment are essential parameters in the preparation of the biomass, in particular in the most widely used gasification processes.

The treatment of biomass is well known to a person skilled in the art for upgrading it through the production of hydrocarbons. The principal steps of this treatment are drying, heat treatment such as torrefaction, and grinding. These steps are in particular described in application WO 2014/068253. The principal parameters of this treatment are the characteristics of the powder obtained, in particular its dimensions, as well as the energy costs of grinding, and more generally of the process.

Application WO 2013/114328 describes a method for grinding the carbonaceous feed obtained from biomass in the presence of additives in the form of powder with micronic dimensions obtained from mineral material such as magnesium stearate or silica in the form of microbeads, and/or plant material such as wood charcoal, with the aim of improving the properties of the powder obtained by grinding the biomass, such as the flowability and suitability for fluidization, and also being able to obtain an intimate mixture of powders with small granulometries. That document does not describe the use of any additives other than in powder form and only with micronic dimensions, during grinding of the biomass.

Optimization of the treatment and of conditioning of the biomass, in particular by simplifying the processes employed, reducing the energy costs of said steps, in particular the grinding step, remains a significant challenge in the field of the invention.

Surprisingly, the Applicant has discovered a process for the treatment of a first biomass feed by at least one step for co-grinding of said feed as a mixture with at least one second biomass feed. Advantageously, said co-grinding allows the feeds to be ground, along with drying and grinding of the second biomass feed. In fact, grinding the biomass feed is an exothermic step and the heat generated may advantageously be used to simultaneously dry the second biomass feed. A further advantage of the process in accordance with the invention is the reduction in the energy costs of the process by energetic integration of the gases formed during the various steps.

SUMMARY OF THE INVENTION

One aim of the present invention is to provide a novel process for the treatment of a first biomass feed, said process comprising the following steps:
a) a step for drying said feed at a temperature in the range 20° C. to 180° C. for a period in the range 5 to 180 minutes,
b) a step for torrefaction of the dried feed obtained from step a) in order to produce at least one solid torrefied biomass effluent, and
c) a step for co-grinding the solid torrefied biomass effluent obtained from step b) in the presence of a second biomass feed in order to obtain a powder.

One advantage of the process in accordance with the present invention is to enable an intimate mixture of powders with small granulometries to be obtained, deriving from biomass feeds.

One advantage of co-grinding in accordance with the present invention is to enable a second unrefined biomass feed to be dried simultaneously with the co-grinding step c) by transferring the thermal energy generated by grinding the torrefied biomass to the second biomass feed.

A further advantage of the present invention is to enable the biomass to be treated at a limited energy cost thanks to a combination of a sequence of steps operating under specific conditions, enabling energetic integration thereof.

Preferably, the process comprises a step d) for final drying of the powder obtained from step c) at a temperature in the range 100° C. to 300° C.

Preferably, the drying step d) is carried out simultaneously with the co-grinding step c). Preferably, the biomass is selected from any type of biomass, preferably from a solid type biomass, and in particular from lignocellulosic type biomass. Preferably, the process comprises a step i) for pre-treatment of the first biomass feed, preferably a primary grinding step.

Preferably, the torrefaction step b) is carried out at a temperature in the range 200° C. to 350° C., preferably in the range 220° C. to 340° C., preferably in the range 250° C. to 320° C. and more preferably in the range 270° C. to 300° C., for a period in the range 5 to 180 minutes, and preferably in the range 15 to 60 minutes, at an absolute operating pressure which is preferably in the range 0.01 to 1.5 MPa, preferably in the range 0.01 to 1.0 MPa and more preferably in the range 0.05 to 0.15 MPa.

Preferably, the process comprises a step ii) for combustion of the torrefaction gases obtained from step b).

Preferably, the energy obtained from step ii) for combustion of the torrefaction gases is used to supply the necessary thermal energy to a step of the process, preferably to steps a), b) and/or d).

Preferably, the second biomass feed undergoes a step iii) for preliminary drying and/or for primary grinding.

Preferably, the solid torrefied biomass effluent obtained from step b) is introduced into the co-grinding step c) in a percentage by weight between the solid torrefied biomass effluent in the total solid feed in the range 1% to 99% by weight, preferably in the range 50% to 98% by weight, and preferably in the range 40% to 95% by weight, said total solid feed being the sum of the solid torrefied biomass effluent and the second biomass feed.

Preferably, the second unrefined biomass feed which may or may not have undergone a preliminary drying step iii) entering the co-grinding step c) has a moisture content in the range 3.1% to 30% by weight, preferably in the range 4% to 25% by weight, and most preferably in the range 5% to 20% by weight.

Preferably, the process comprises one or more steps e) for storage of the effluent obtained from one or any of the steps of the process, and preferably from one or more of the steps a), b), c) or d).

Preferably, the process comprises a step f) for transport, preferably pneumatic transport.

Preferably, the process comprises a step g) for gasification at a temperature in the range 800° C. to 1800° C., preferably in the range 1000° C. to 1600° C. and more preferably in the range 1200° C. to 1500° C. and at an absolute pressure which is advantageously in the range 2.0 to 12.0 MPa, preferably in the range 2.5 to 6.0 MPa, and more preferably in the range 3.0 to 5.0 MPa.

DEFINITIONS AND ABBREVIATIONS

Throughout the description, the terms or abbreviations hereinbelow have the following meaning:

In a non-limiting manner, the term "biomass feed" means biomass of the solid type, and in particular lignocellulosic type biomass. Non-limiting examples of types of biomass concern, for example, residues from agricultural operations (in particular straw, maize cobs), residues from forestry operations, forestry products, residues from sawmills, and dedicated cultures, for example short rotation coppice.

The term "anhydrous weight loss" means the percentage of material lost during the torrefaction step (excluding water) with respect to the total weight injected into the torrefaction step (excluding water).

The term "torrefaction" means a heat treatment process at a temperature in the range 200° C. to 350° C., and generally carried out in an oxygen-depleted atmosphere.

The term "gasification" means a step implementing a partial oxidization reaction which converts the feed into synthesis gas principally comprising carbon monoxide and dihydrogen.

The term "co-grinding" means grinding the biomass feed in the presence of the second unrefined biomass feed.

The term "ratio", "weight ratio" means the ratio between the weight of the constituent in question with respect to the total weight of the feed.

The term "characteristic size" means the measurement of the length of a particle along its largest dimension.

The term "anisotropic" means variable properties as regards the strength of the material as a function of the orientation of the force applied to it.

The term "moisture content" means the ratio between the weight of water contained in a feed and the total weight of said feed.

DETAILED DESCRIPTION OF THE INVENTION

In the context of the present invention, the various embodiments presented in the description as a whole may be used alone or in combination with one another, with no limitations on combinations.

The Feed

In accordance with the invention, the first and second feeds of the process are selected from biomass, alone or as a mixture. The quantity of water contained in the feed is in the range 1% to 80% by weight, preferably in the range 5 to 75% and preferably in the range 10 to 70%.

The biomass is selected from any type of biomass, preferably biomass of the solid type, and in particular lignocellulosic type biomass. Non-limiting examples of types of biomass concern, for example, residues from agricultural operations (in particular straw, maize cobs), residues from forestry operations, forestry products, residues from sawmills, and dedicated cultures, for example short rotation coppice.

Preferably, the biomass is lignocellulosic biomass. It essentially comprises three natural constituents present in variable quantities depending on its origin: cellulose, hemicellulose and lignin.

The lignocellulosic biomass feed is used as is, i.e. with all of its three constituents: cellulose, hemicellulose and lignin.

In a preferred embodiment of the invention, the lignocellulosic biomass is selected from grass biomass, residues from agricultural operations such as waste straw, maize cobs, crushed sugar cane stalks, residues from forestry operations or from sawmills such as wood chips or any other type of ligneous residues.

In a preferred embodiment of the invention, the first biomass feed may optionally undergo a step i) for pre-treatment prior to introducing it into step a) of the process in accordance with the invention. The aim of the pre-treatment step i) is to enable the pre-treated feed to be injected into the drying step a).

The pre-treatment step i) is a function of the type of feed under consideration. Preferably, the pre-treatment step i) is a primary step for grinding said feed, making it possible to reduce its granulometry to a characteristic size in the range 10 to 50 mm. Said primary grinding step i) is advantageously carried out using a technique which is known to a person skilled in the art. The pre-treatment step i) may also advantageously comprise shaping the feed such as, for example, by pelletization, compression or any other technique known to a person skilled in the art with a view to facilitating its transport, storage and subsequent treatment in drying step a) of the process in accordance with the invention.

Drying Step a

In accordance with the invention, the process comprises a step a) for drying the first biomass feed, optionally pre-treated, said drying step a) being carried out by bringing the feed into contact with a hot stream of gas which cools down. The stream of hot gas enters said step at a temperature in the range 50° C. to 500° C., preferably in the range 100° C. to 450° C., and more preferably in the range 150° C. to 350° C., for a period in the range 5 to 180 minutes, preferably in the range 10 to 100 minutes and more preferably in the range 15 to 60 minutes, to provide the dried and optionally pre-treated feed. The dried solid leaves said step at a temperature in the range 40° C. to 120° C., preferably in the range 50° C. to 90° C., even more preferably in the range 60° C. to 80° C.

The purpose of drying is to eliminate the water contained in the feed. In accordance with the invention, the quantity of residual water at the end of the drying step a) is in the range 0.0 to 5.0% by weight with respect to the total weight of the feed, preferably in the range 0.0 and 4.5%, and more preferably in the range 0.0 to 4.0%.

The energy necessary for drying is generally supplied by bringing the feed into contact with a stream of hot gases.

The stream of hot gases used in the drying step may advantageously originate from the combustion of an input to the process, and preferably from the combustion of natural gas and/or from the combustion of a gaseous stream obtained from another step for the process.

As an example, combustion of the gases obtained from the torrefaction step b) produces a hot stream of gas which may be used for drying the feed by any method known to a person skilled in the art.

The gaseous effluent obtained from step a) containing water may be used to pre-heat the air allowing combustion of the natural gas and/or of the gaseous stream produced during torrefaction.

Torrefaction Step b

In accordance with the invention, the dried feed obtained from step a) is sent to a torrefaction step b) in order to produce at least one solid torrefied biomass effluent.

Torrefaction is a process of mild thermal decomposition within a temperature interval in the range 200° C. to 350° C. This process is generally characterized by low temperature ramp-ups (<50° C./min) and long dwell times (in the range 20 min to 60 minutes).

In accordance with the invention, the torrefaction step b) is carried out at a temperature in the range 200° C. to 350° C., preferably in the range 220° C. to 340° C., preferably in the range 250° C. to 320° C. and more preferably in the range 270° C. to 300° C., for a period in the range 5 to 180 minutes, and preferably in the range 15 to 60 minutes, at an absolute operating pressure which is preferably in the range 0.01 to 1.5 MPa, preferably in the range 0.01 to 1.0 MPa, and more preferably in the range 0.05 to 0.15 MPa. The torrefaction operation is carried out in an environment with an oxygen content which is less than 10.0% by volume, preferably in the range 0.0 to 10.0% by volume, preferably in the range 0.0 to 8.0% by volume and more preferably in the range 0.0 to 3.0% by volume.

At about 200° C., hemicelluloses, which are the most reactive compounds of the lignocellulosic biomass, begin to undergo devolatilization and carbonization reactions. At this temperature level, the cellulose and the lignin, for their part, are only transformed to a slight extent. The decomposition products of the lignocellulosic biomass are generated in the form of condensable gases (principally water, formic acid, acetic acid and other organic compounds) and non-condensable gases (principally CO and $CO_2$).

Torrefaction modifies the structure of the lignocellulosic biomass, and thus its properties. In particular, the torrefaction operation makes the biomass more fragile and attenuates its highly anisotropic character. It is well known to a person skilled in the art that wood, for example, due to its fibrous nature, will have a much greater elastic resistance to stretching if application is in the direction of the fibres than if application is transversally thereto. Thus, compared with a biomass powder with a given mean granulometry, obtaining an equivalent powder from the same biomass having undergone a torrefaction step would require a much lower grinding energy (effect linked to the fragility of the material) and the final shape of the solid particles obtained is closer to spherical particles (effect linked to a less anisotropic character), which facilitates subsequent grinding.

Said torrefaction step b) may advantageously be employed in a device of the rotary furnace, rotary calciner, screw conveyor, moving bed and fluidized bed furnace type.

In accordance with the invention, the torrefaction step b) produces a solid effluent known as torrefied biomass.

Said torrefaction step b) may also be used to produce a combustible gaseous effluent, known as torrefaction gas, the quantity of which preferably represents 5.0% to 40.0% of the weight of dried biomass obtained from the initial step a), depending on the operating conditions and more preferably from 10.0% to 35.0%.

One of the key parameters in the torrefaction step is the anhydrous weight loss (expressed as a percentage by weight), defined as the percentage weight loss between the initial dry biomass and the dry torrefied biomass. The higher this loss, the lower the solid yield by weight, and the greater the quantity of torrefaction gas generated. It is known that the lower calorific value (LCV) of this gas is also a function of the anhydrous weight loss percentage (the LCV is an increasing function of this percentage for a given feed).

In accordance with the invention, the choice of a sufficiently high percentage for the anhydrous weight loss during the torrefaction step makes it possible to limit the consumption of a fuel which is input into the process, in particular during drying. Thus, it limits the use of fuel of fossil origin by upgrading the torrefaction gases generated in the torrefaction step.

In a preferred embodiment, the percentage anhydrous weight loss is selected in a manner such that the heat given off by combustion of the torrefaction gases (internally or externally upon post-combustion) allows the energy necessary for at least one drying step to be supplied. Preferably, the anhydrous weight loss is in the range 1.0% to 40.0% by weight, preferably in the range 5.0% to 35.0% by weight, and more preferably in the range 15.0% to 30.0% by weight, with respect to the total weight of the feed introduced into the torrefaction step b).

In one embodiment of the process, the torrefaction gases are sent to a combustion step ii) in which they are burned in order to produce a stream of hot gases in a combustion chamber in the presence of air and optionally natural gas which may be sent to the drying steps a) and/or d), or a stream of hot air which may be returned to the torrefaction step b). The combustion step ii) may advantageously be integrated with torrefaction step b), or otherwise.

In one embodiment, the energy produced during the step ii) for combustion of the torrefaction gases obtained from step b) is used in order to supply the energy necessary for at least one step of the process, preferably the drying step a), and preferably also for the final drying step d), via the stream, or to step b) for torrefaction via the stream.

The thermal energy obtained from the combustion step ii) is sent to steps a) and/or d) using means which are known to a person skilled in the art.

A portion of the hot stream of gas obtained from the combustion step ii) may advantageously be sent to a heat exchange step in order to pre-heat the air used in the drying step a) and in the final drying step d).

In one embodiment, a portion of the stream of hot gases obtained from the combustion step ii) is injected directly into the torrefaction step b) so as to supply, by gas/solid heat exchange, the energy necessary for the conversion of the biomass feed.

If the stream of combustible torrefaction gas obtained from step b) is insufficient, a makeup of fuel and preferably of natural gas may advantageously be introduced in combustion step ii) in order to obtain the energy necessary for the various steps which consume thermal energy.

At the end of the torrefaction step b), the solid torrefied biomass effluent obtained has a moisture content in the range 0.0 to 5.0% by weight, and preferably in the range 0.0 to 3.0% by weight, and more preferably in the range 0.001% to 3.0% by weight. The term "solid torrefied biomass" means a solid obtained by torrefaction of the biomass.

The solid torrefied biomass obtained at the end of step b) may optionally be stored in an optional storage step before it is introduced in co-grinding step c) of the process in accordance with the invention. Said storage step may advantageously be carried out using methods which are known to a person skilled in the art. Preferably, the torrefied solid biomass may be stored in tanks with screw conveyors, in silos, or in a hangar in suitable open cells.

In the advantageous case in which the co-grinding step c) is carried out sequentially, a storage step makes it possible to continue to operate the torrefaction step b) and the optional combustion step ii) in order to continue to produce the stream of hot gas necessary for the drying step a) and the final drying step d).

Co-Grinding Step c

In accordance with the invention, the process comprises a step c) for co-grinding the solid torrefied biomass effluent obtained from step b), and having optionally been stored in an optional storage step, in the presence of a second biomass feed in order to obtain a ground effluent, also known as ground powder. Said co-grinding step c) is carried out at a temperature in the range 0° C. to 150° C. and preferably in the range 20° C. to 100° C. and more preferably in the range 50° C. to 90° C. The second biomass feed and the solid torrefied biomass effluent are ground simultaneously in one and the same mill.

The aim of the co-grinding step c) is to reduce the granulometry of the two biomass feeds introduced in said step c), while providing a particle shape which is suitable for the subsequent transport and use thereof, and preferably for their injection into a gasification step. The particles of the effluent at the end of said co-grinding step have a mean size in the range 50 to 500 microns, preferably in the range 70 to 200 microns and preferably in the range 80 to 150 microns.

Said second biomass feed introduced in the co-grinding step c) is selected from the biomass feeds as defined above. The second biomass feed may be identical to or different from the biomass feed introduced into the drying step a).

Preferably, the dimensions of the second biomass feed introduced in the co-grinding step c) are in the range 1 to 100 millimetres and preferably in the range 5 to 50 millimetres.

In a preferred embodiment of the invention, said second biomass feed may optionally undergo a step iii) for pretreatment prior to its introduction into step c) of the process in accordance with the invention. The aim of the pre-treatment step iii) is to allow the second biomass feed to be injected into the co-grinding step c) under the desired, specific conditions.

The pre-treatment step iii) is a function of the type of the second biomass feed under consideration. Preferably, the pre-treatment step iii) is a step for primary grinding of said second feed, meaning that its granulometry can be reduced to a characteristic size in the range 10 to 50 mm. Said primary grinding step iii) is advantageously carried out using a technique which is known to the person skilled in the art. The pre-treatment step iii) may also advantageously comprise shaping the second biomass feed such as, for example, by pelletization, compression or any other technique which is known to the person skilled in the art with a view to facilitating its transport, storage, and its subsequent treatment in the step c) for co-grinding in the process in accordance with the invention.

Advantageously, the pre-treatment step iii) is a step for preliminary drying which is dependent on the initial moisture content of the second biomass feed before it is introduced into the co-grinding step c). The preliminary drying step iii) can be used to obtain an unrefined second biomass feed which is said to be pre-dried and to make it compatible with injecting it into the co-grinding step c).

Preferably, the moisture content of the second biomass feed entering the co-grinding step c) must be in the range 3.1% to 30.0% by weight, preferably in the range 4.0% to 25.0% by weight and highly preferably in the range 5.0% to 20.0% by weight.

Preferably, the solid torrefied biomass effluent and the second biomass feed are introduced into said co-grinding step c) in a manner such that the percentage by weight between the solid torrefied biomass effluent in the total solid feed feeding the co-grinding step c) is in the range 1% to 99% by weight, preferably in the range 40% to 98% by weight, preferably in the range 50% to 95% by weight. The term "total solid feed" means the sum of the solid torrefied biomass effluent and the second biomass feed.

Preferably, the co-grinding step may be carried out in the presence of an additional compound which may be used for the subsequent gasification step; said compound is selected from vitrified ash, sand, limestone, lime or other compounds known to the person skilled in the art, alone or as a mixture.

Preferably, the mill is selected in a manner such as to optimize pneumatic transport of the powder obtained from step c), by minimizing the minimum fluidization velocity (MFV), as well as its own energy consumption.

Preferably, said co-grinding step c) is carried out in a mill of the "roller mill", "universal" or "attrition" type, or any other types of mill known to the person skilled in the art.

Surprisingly, the Applicant has observed that co-grinding of the solid torrefied biomass effluent and of a second biomass feed, in addition to grinding the unrefined second biomass feed, also results in particularly efficient drying of said biomass feed. In fact, grinding is a highly exothermic step. In addition, an implementation as described in accordance with the invention produces an intimate mixture of the two biomass feeds. Thus, co-grinding a feed which is not very moist, such as the solid torrefied biomass effluent with a moist feed, such as the second biomass feed, means that the heat generated by grinding the biomass can be transferred to the water contained in the second biomass feed, thereby optimizing drying of the latter. This simultaneous drying advantageously makes it possible to simplify the number of steps of the process as well as limit its energy consumption.

Optional Final Drying Step d

In a particular embodiment, the process in accordance with the invention may also comprise a step d) for final drying of the powder obtained at the end of step c). This final drying step d) is carried out by bringing the feed into contact with a stream of gas. Said stream of gas enters said step at a temperature in the range 50° C. to 150° C., preferably in the range 70° C. to 120° C., in order to produce a dried powder.

The aim of the optional final drying step d) is to reduce the moisture content of the powder obtained from step c) to an acceptable level for its injection into a subsequent treatment step and preferably into a gasification step. Preferably, the optional final drying step d) makes it possible to reduce the moisture content of the powder obtained at the end of step c) to below 3.0% by weight, preferably to between 1.0% and 3.0% by weight.

Preferably, the final drying step d) is carried out simultaneously with the co-grinding step c).

The thermal energy necessary for this drying is supplied either by combustion of a stream entering the process (natural gas for example) or, as is preferable, by means of a heat exchange preheating the drying air by using a hot effluent from the combustion step ii). In accordance with the invention, the choice of a sufficiently high anhydrous weight loss percentage in torrefaction step b) makes it possible to limit the use of a fuel entering the process in step d); in particular, it limits the use of fuel of fossil origin.

Optional Storage Step e

The process in accordance with the invention may advantageously comprise one or more steps e) for storage of the effluent obtained from any one of the steps of the process, preferably step a), b), c) or d). Preferably, the effluent obtained from step c) or d) is stored in order to produce a stored effluent, also known as stored powder.

The storage means that a buffer volume of feed can be retained. This volume is necessary in order to retain the ability to operate the downstream section in the case of a stoppage of the upstream section.

The storage step e) is preferably constituted by silos having useful volumes which are sufficient to guarantee a supply to the downstream section. As an example, the volume of these silos must guarantee a supply to the downstream section for 24 to 48 hours.

The storage step e) may also include a pressurization system by means of a variety of successive tanks operating sequentially so as to increase the storage pressure of the feed until it reaches a pressure compatible with its injection into a subsequent step and preferably into a gasification step.

Optional Transport Step f

The effluent obtained from step c) or the effluent obtained from step d) or the effluent obtained from the storage step e) may advantageously undergo a transport step f). The effluent transported in this manner is known as transported effluent or in fact transported powder. The transport step f) may be used to convey the effluent, preferably formulated and having the desired composition, to a subsequent step and preferably to a gasification step g).

Preferably, the transport step f) is carried out using pneumatic transport technology.

The carrier gas used in step f) for transfer by pneumatic transport is preferably nitrogen, $CO_2$ or any other inert gas making it possible to avoid the formation of a zone with an explosive atmosphere (ATEX powders) and compatible with the subsequent step located downstream, and preferably with the gasification step g).

The carrier gas flow rate is calculated using methods which are known to a person skilled in the art so as to obtain both the desired flow rate and transport density. The parameters of the torrefaction step b) and of the co-grinding step c) are selected so as to optimize the quality of this transport (MFV optimized according to the energy consumption of these sections).

Optional Gasification Step g

The powder obtained from step c), d) or from a storage step e) is transported to step f), which has preferably been formulated and has the desired composition, may advantageously be sent to a subsequent gasification step g).

Said gasification step g) carries out a partial oxidization reaction which converts the feed into a synthesis gas comprising mainly carbon monoxide and hydrogen. The gasification step g) is advantageously carried out in the presence of a controlled quantity of oxygen in the form of a stream the flow rate of which is controlled and contains at least 90% by volume of oxygen, preferably at least 96% by volume of oxygen.

Step g) for gasification of the effluent is advantageously carried out using methods which are known to a person skilled in the art.

Preferably, it is carried out in a gasifier of the plasma, fixed bed or fluidized bed type, or more preferably in an entrained flow gasifier with cooled walls at a high temperature, i.e. at a temperature in the range 800° C. to 1800° C., preferably in the range 1000° C. to 1600° C. and more preferably in the range 1200° C. to 1500° C., and advantageously at an absolute pressure in the range 2 to 12 MPa, preferably in the range 2.5 to 6 MPa, and more preferably in the range 3 to 5 MPa. The high temperature makes it possible to obtain a high degree of carbon conversion and therefore to reduce the quantity of unconverted carbon in the ash produced, and thus to reduce the quantity of ash recycled to the gasifier.

In a particular embodiment of the invention, the process comprises the steps a), b) and c), or the steps a), b), c) and d), or the steps a), b), c), d) and e), or the steps a), b), c), d), e) and f), or the steps a), b), c), d), e), f) and g).

In a particular embodiment of the invention, the process is constituted by the steps a), b) and c), or the steps a), b), c) and d), or the steps a), b), c), d) and e), or the steps a), b), c), d), e) and f), or the steps a), b), c), d), e), f) and g).

The following examples illustrate the invention without limiting its scope.

EXAMPLES

Example 1: Process Without Co-Grinding (in Accordance with the Prior Art)

In accordance with this example, the process allows two feeds to be treated on two distinct preparation lines:
- a feed A of the lignocellulosic biomass type in the form of oak wood chips with a characteristic size of 20 to 30 mm. The moisture content of this feed was 30% by weight.
- a second feed B of biomass of the lignocellulosic biomass type in the form of beech wood chips with a characteristic size of 20 to 30 mm. The moisture content of this feed was 30% by weight.

The feeds A and B here were different.

This process did not have a co-grinding step, nor a step for energetic integration between the steps for the treatment of feeds A and B.

The process for the treatment of feed A comprised a step for the energetic integration of the torrefaction step b) with step a) for drying the biomass.

The aim of this process was to prepare 1 tonne of feed per hour for the downstream process, in this case a gasification process.

Description of the Line for the Preparation of Feed A

The feed A was mixed with the second biomass feed B. The mixture was sent to a drying step in order to allow the moisture content of the feed to be reduced to 3% by weight. The temperature of the solid at the end of the drying step was 70° C. The dried chips were conveyed into a torrefaction step operating at a mean temperature of 300° C. The anhydrous weight loss during the torrefaction step was 27%. The residual moisture content of the chips at the end of this step was considered to be zero.

The dried and torrefied chips were sent to a grinding step the technology of which is known to the person skilled in the art, for example of the roller mill type. This step made it possible to reduce the size of a majority of the particles (90% of the particles) to below 90 microns. The technique used for the characterization of the particle size employed sieves in accordance with the standard NF EN 933.

In accordance with this example, there was no step known as the final drying step; the feed A in the form of dried and torrefied powder was sent by means of pneumatic transport in dilute phase to a storage step, then to a pneumatic transport step, making it possible to inject it into the downstream gasification process. The pneumatic transport here was carried out in the dense phase. The dense phase pneumatic transport step here was carried out with nitrogen as the inert carrier gas.

The table below provides the utilities consumption for this layout:

| | Utilities & production | | |
|---|---|---|---|
| | Biomass feed A DAF | t/h | 1.02 |
| | Biomass feed B DAF | t/h | 0.25 |
| | Feed produced | t/h | 1.00 |
| Steps as whole | Electricity consumed | MJ/h | 153 |
| Steps d) and d') | Natural gas consumed | MJ/h | 293 |
| Steps e), f), e') and f') | Nitrogen consumed | Nm$^3$/h | 313 |

The electricity consumed included the electricity necessary for grinding in the roller mill.

The natural gas consumed corresponded to the primary and final drying steps.

The nitrogen corresponded to the requirements for pneumatic transport and for aeration in the silos.

Example 2: Process with Co-Grinding without Energetic Integration of the Step (?) (in Accordance with the Invention)

In accordance with this example, the process enabled two feeds to be treated:
 a first biomass feed A of the lignocellulosic biomass type in the form of oak wood chips with a characteristic size of 20 to 30 mm. The moisture content of this feed was 30% by weight.
 a second feed B of biomass of the lignocellulosic biomass type in the form of beech wood chips with a characteristic size of 20 to 30 mm. The moisture content of this feed was 30% by weight.

This process comprised a co-grinding step between the line for the preparation of the feed A and that for the feed B and did not have any energetic integration with the drying step d). The co-grinding and final drying steps were carried out simultaneously.

The heat obtained from combustion of the torrefaction gas was used in the torrefaction step b) as well as for the drying step a).

The aim of this process was to prepare 1 tonne of feed per hour for the downstream process, in this case gasification.

Description of the Line for the Preparation of the Mixed Feed

The feed A was sent to a drying step in order to reduce the moisture content of the feed to 3% by weight. The temperature of the solid at the end of the drying step was 70° C. The dried chips were conveyed into a torrefaction step operating at a mean temperature of 300° C. The anhydrous weight loss during the torrefaction step was 27%. The residual moisture of the chips at the end of this step was negligible and was considered to be zero.

The dried and torrefied chips were sent to a co-grinding step the technology of which is familiar to the person skilled in the art, for example of the roller mill type. The second biomass feed B was conveyed directly into this same mill without initial pre-treatment. This step made it possible to reduce the size of a majority of the particles (90% of the particles) to below 90 microns. The technique used for the characterization of the particle size employed sieves in accordance with the standard NF EN 933.

In accordance with this example, the mixture of feeds underwent a drying step d) concomitantly with the grinding step. An unexpected effect of this grinding-drying as a mixture was to reduce the energy necessary for drying the feed B. In fact, grinding the feed A is exothermic and produces heat used for drying the feed B. Said heat generated by grinding A made it possible to significantly reduce the energy consumed for drying. This effect was reflected in the natural gas consumption of the burner, meaning that the temperature of the atmosphere of the burner could increase. The mixture of feeds A and B in the form of dried powder obtained from grinding was sent by means of pneumatic transport in dilute phase to a storage step, then into a pneumatic transport step, meaning that it could be injected into the downstream gasification process. The pneumatic transport here was carried out in the dense phase. The dense phase pneumatic transport step here was carried out with an inert carrier gas, the gas being nitrogen in this example.

The table below provides the utilities consumption for this layout:

| | Utilities & production | | |
|---|---|---|---|
| | Biomass feed A DAF | t/h | 1.02 |
| | Biomass feed B DAF | t/h | 0.25 |
| | Feed produced | t/h | 1.00 |
| Steps as whole | Electricity consumed | MJ/h | 127 |
| Steps d) | Natural gas consumed (LCV) | MJ/h | 286 |
| Steps e) and f) | Nitrogen consumed | Nm3/h | 339 |

The electricity consumed included the electricity necessary for grinding in the roller mill.

The natural gas consumed corresponded to the final drying step d).

The nitrogen corresponded to the requirements for pneumatic transport and for aeration in the silos.

Example 3: Process with Co-Grinding, with Energetic Integration with the Final Drying Step d) (in Accordance with the Invention)

In accordance with this example, the process comprised a co-grinding step between the line for the preparation of the feed A and that for the feed B and therefore allowed the two feeds to be treated on one and the same preparation line. In addition, this process comprised energetic integration with the final drying step d).

The co-grinding and final drying steps were carried out simultaneously.

The characteristics of the feeds A and B utilized in this process were identical to those of feeds A and B utilized in Example 2.

The heat obtained from combustion of the torrefaction gases was used in the torrefaction step b) and also in the drying step a).

The advantage of the process employed in this example is an energetic integration between the torrefaction step and the final step for drying the powder of the feed mixture. In this case, the anhydrous weight loss was approximately 28% and advantageously made it possible to produce the heat necessary for said final drying.

The energetic integration, also known as thermal integration, was carried out here indirectly by means of a heat exchanger.

The table below provides the utilities consumption for this layout:

| | Utilities & production | | |
|---|---|---|---|
| | Biomass feed A DAF | t/h | 1.06 |
| | Biomass feed B DAF | t/h | 0.25 |
| | Incoming feed | t/h | 1.00 |
| Steps as whole | Electricity consumed | MJ/h | 127 |
| Step d) | Natural gas consumed (LCV) | MJ/h | 0 |
| Steps e) and f) | Nitrogen consumed | Nm3/h | 339 |

The electricity consumed included the electricity necessary for grinding in the roller mill.

The natural gas consumed corresponded to the final drying step d).

The nitrogen corresponded to the requirements for pneumatic transport and for aeration in the silos.

These examples clearly show that co-grinding (Example 2) of the feeds A and B made it possible to significantly reduce the consumption of natural gas, from 293 (Example 1) to 286 Mj/h. Furthermore, the energetic integration with the final drying step d) (Example 3) allowed it to be autothermic, i.e. with no need for an external supply of energy. The input feed flow rate into the process was thus 1.06 t/h for a production of 1.0 t/h. The corresponding anhydrous weight loss thus made it possible to generate the heat necessary for thermal integration of the torrefaction with final drying of the feed.

The invention claimed is:

1. A process comprising treatment of a first solid biomass feed, by the following:
    a) drying said feed at a temperature in the range 20° C. to 180° C. for a period in the range 5 to 180 minutes,
    b) torrefaction of the dried feed obtained from a) in order to produce at least one solid torrefied biomass effluent, and
    c) co-grinding the solid torrefied solid biomass effluent obtained from b) in the presence of a second solid biomass feed in order to obtain a powder, and
    d) final drying of powder obtained from c), carried out simultaneously with the co-grinding in c, in which the second solid biomass feed entering the co-grinding c) has a moisture content in the range 4 to 25% by weight.

2. The process as claimed in claim 1, wherein in d) final drying of the powder obtained from c) is at a temperature in the range 100° C. to 300° C.

3. The process as claimed in claim 1, in which the first and second solid biomass feed are solid lignocellulosic biomass.

4. The process as claimed in claim 1, in which the first and second solid biomass feed are identical.

5. The process as claimed in claim 1, comprising i) pre-treatment of the first solid biomass feed by primary grinding.

6. The process as claimed in claim 1, in which the torrefaction b) is carried out at a temperature of 200° C. to 350° C., for a period of 5 to 180 minutes, and at an absolute operating pressure which is 0.01 to 1.5 MPa.

7. The process as claimed in claim 1, comprising ii) combustion of the torrefaction gases obtained from b).

8. The process as claimed in claim 7, in which the energy obtained from ii) combustion of the torrefaction gases is used to supply the necessary thermal energy to a), b) and/or d).

9. The process as claimed in claim 1, in which the second solid biomass feed undergoes iii) preliminary drying and/or primary grinding.

10. The process as claimed in claim 1, in which the solid torrefied biomass effluent obtained from b) is introduced into the co-grinding c) in a percentage by weight between the solid torrefied biomass effluent in the total solid feed of 1% to 99% by weight, said total solid feed being the sum of the solid torrefied biomass effluent and the second solid biomass feed.

11. The process as claimed in claim 1, in which the second solid biomass feed entering the co-grinding c) has a moisture content in the range 5 to 20% by weight.

12. The process as claimed in claim 1, comprising e) storing one or more effluents obtained from one or any of steps of the process.

13. The process as claimed in claim 1, further comprising f) transport of effluent of c) or d).

14. The process as claimed in claim 1, comprising g) gasification at a temperature in the range 800° C. to 1800° C. and at a pressure which is 2 to 12 MPa.

* * * * *